(12) United States Patent
Kitayama et al.

(10) Patent No.: US 7,567,948 B2
(45) Date of Patent: Jul. 28, 2009

(54) METHOD AND SYSTEM FOR OBTAINING A COMBINATION OF FAULTY PARTS FROM A DISPERSED PARTS TREE

(75) Inventors: Fumihiko Kitayama, Sagamihara (JP); Hirofumi Matsuzawa, Sagamihara (JP); Masayuki Numao, Kawasaki (JP); Madoka Yuriyama, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/865,199

(22) Filed: Oct. 1, 2007

(65) Prior Publication Data

US 2008/0147586 A1 Jun. 19, 2008

(30) Foreign Application Priority Data

Oct. 5, 2006 (JP) .............................. 2006-273514

(51) Int. Cl.
G06F 15/18 (2006.01)
G06F 15/00 (2006.01)
(52) U.S. Cl. ........................................ 706/62; 706/902
(58) Field of Classification Search .................. 706/45, 706/62, 902
See application file for complete search history.

(56) References Cited

FOREIGN PATENT DOCUMENTS

| JP | PUPA2003-50701 | 2/2003 |
|---|---|---|
| JP | PUPAH04-273540 | 9/2004 |
| JP | PUPA2005-122270 | 4/2005 |
| JP | PUPA2005-182465 | 6/2005 |
| JP | PUPA2005-322129 | 11/2005 |

*Primary Examiner*—David R Vincent
*Assistant Examiner*—Benjamin Buss
(74) *Attorney, Agent, or Firm*—Ryan K. Simmons; Shimokaji & Associates, P.C.

(57) ABSTRACT

It is an object of the present invention to find out parts to be a highly possible cause of failure without searching all of part data of all of products.

Dispersed parts data on a parts tree are sequentially accessed from a set of known failed products, and part attribute values each having a higher support in the faulty product are extracted. In this process, a subset of parts used in the faulty product is also obtained simultaneously. The part attribute values having higher supports and the subset of parts used in the faulty product are represented as a tree in which a parts type serves as a node. Next, an information gain of a rule that having the two part attribute values is a cause of failure is calculated on two part attribute values having higher supports on the tree of the parts type. This calculation is locally performed on a common parent part of two parts and parts having a certain information gain is outputted as a cause of failure. How to select these two part attributes is performed in such a way that part attributes located closer to each other on the tree are first evaluated, and first found part attributes are made a candidate of a cause of failure.

5 Claims, 10 Drawing Sheets

METHOD AND SYSTEM FOR OBTAINING A COMBINATION OF FAULTY PARTS FROM A DISPERSED PARTS TREE

CROSS REFERENCES TO RELATED APPLICATIONS

This application is related to Japan Patent Application No. 2006-273514, filed Oct. 5, 2006.

FIELD OF THE INVENTION

The present invention relates to a method and a system for obtaining a combination of failed parts from dispersed parts tree. More specifically, the present invention relates to a method, system, and program product for obtaining a combination of parts characteristics causing a failure from a set of dispersed parts tree and failed products.

BACKGROUND OF THE INVENTION

In a manufacturing industry such as an automobile industry where complicated products are produced in large quantities, quality control is one of the important issues. However, globalization and expansion in corporate activities lead to dispersion of databases used in the parts management and the quality control, and thus global quality control beyond the fields is becoming difficult.

Meanwhile, a product trouble leading to a recall with a tremendous cost is increasing due to complication of the product itself. In order to reduce such a cost, it is required to specify a cause of failure and to take necessary measures in an early stage of the failure becoming evident.

A method of controlling the quality in the manufacturing industry depends on how to manage a development process and a manufacturing process, and data related thereto. For example, in the automobile industry, data called a bill of materials is created during design and during production to be utilized for executing the processes or solving the quality problems. As for a bill of materials used during designing (E-BOM; Engineering Bill Of Materials) and a bill of materials used during production (M-BOM; Manufacturing BOM), however, different bills of materials are usually used since the objects thereof are different. Similarly, even for a bill of materials regarding the same production, databases are separately owned by plants and parts suppliers and there is no compatibility therebetween in many cases.

For example, since the bill of materials used during designing includes only design data of the parts, what can be said is that a cause of failure may be the design of a specific part. When an impact of the failure such as a recall is investigated from this bill of materials, all of the products produced according to its design will correspond thereto. Since the number of the impacted products are not able to be narrowed down, the recall is very expensive.

Accordingly, if there are control data, such as parts data in production, for indicating that products of a certain lot (or a unique product serial number) use parts of a certain specified lot, it is possible to say that, for example, only parts of a specific lot are the cause of the trouble. This is superior to the bill of materials during designing as a quality control method since products using only the specific lot may be a recall target.

However, since parts are produced in different plants, or come from external suppliers, parts whose data may not be accessed, more detailed data, such as the lot or the like, than the supplier's name may not be obtained. In order to perform the quality control, the information infrastructure should be improved in a certain way to thereby allow the dispersed quality control data to be systematically accessed and the data to be traced.

The traces of such an individual product level and a parts lot level are effective, but if there is a large amount of parts data in dispersed data sources, it is not realistic to access and trace all of the data. Particularly, when the trouble is caused not by a single part but by a combination of a plurality of parts, it is difficult to know whether or not the combination is truly problematic by collecting only a lot number of individual parts which can be traced from the known failed product.

SUMMARY OF THE INVENTION

The invention provides a method of obtaining a combination of part attribute values, as a candidate for cause of failure from data from a bill of materials holding attribute values of the parts. The method may include the general steps of: extracting part attribute values each having a support higher than a predetermined value from a set of failed products; calculating an information gain of a rule that a combination of the part attribute values each having the support higher than the predetermined value is a cause of failure; and selecting the rule having the information gain larger than a predetermined threshold. The method may include having the part attribute values selected by regarding sequence values as a single value. The method step of extracting the part attribute values each having the support higher than the predetermined value, may include a part's subset of the parts used in the failed product being simultaneously obtained. Further the method step of calculating the information gain, when pieces of parts information are dispersed at different locations, may include a set of common parent parts of two parts is obtained by tracing from two parts having respective attribute values, and an information gain of a rule that having two part attribute values is a cause of failure is calculated, from the subset of common parent parts used in the failed product, by using only sub-tree information of part of data of the bill of materials. Additionally, the method step wherein a determination of the predetermined threshold is performed so that the number of possible combinations of part attribute values is narrowed down by gradually increasing the threshold.

The invention provides an information system for obtaining a combination of part attribute values as a candidate of a cause of failure from data of bill of materials holding attribute values of parts. The system may generally include: a part attribute value extracting section for extracting part attribute values each having a support higher than a predetermined value from a set of failed products; an information gain calculating section for calculating an information gain of a rule that a combination of the part attribute values each having a support higher than the predetermined value is a cause of failure; and an information gain selecting section for selecting the rule having the information gain larger than a predetermined threshold.

The invention also provides a computer program product for obtaining a combination of part attribute values as a candidate of a cause of failure from data of bill of materials holding attribute values of parts. The computer program product generally causes a computer to execute the steps of: extracting part attribute values each having a support higher than a predetermined value from a set of failed products; calculating an information gain of a rule that a combination of the part attribute values each having the support higher than the predetermined value is a cause of failure; and selecting the rule having the information gain larger than a predetermined threshold.

DETAILED DESCRIPTION OF THE INVENTION

Hereinafter, embodiments of the present invention will be described with reference to the drawings and formulas.

The technology of the aforementioned data mining or decision tree assumes that access to the data (a table, a transaction, or the like) can be easily and freely performed, and there is no technology premising that access to all of the products or all of the parts is impossible since the data sources thereof are dispersed.

For example, it is generally possible to find out a combination of attribute values of the parts inducing a cause of failure, by employing a technique of the data mining for finding out a common item (an attribute value of the parts appeared in the failed product) from a given data set (transaction). However, when an attempt is made to specify a cause of failure by a technique using a confidence or the like which is commonly used, it is necessary to aggregate all of the parts with all of the attributes thereof into one table to access all of them, including not only the faulty product but also not faulty products. This is because that in order to calculate the value of confidence or lift or else which is well known in the technique of the data mining, it is necessary to also consider the parts data of sufficient not faulty products other than faulty products. Considering a situation where the parts data is dispersed in a plurality of plants or a plurality of part suppliers, this is not clearly realistic. A calculation of an information gain used in a construction of the decision tree is also similar to that.

Figure 1:
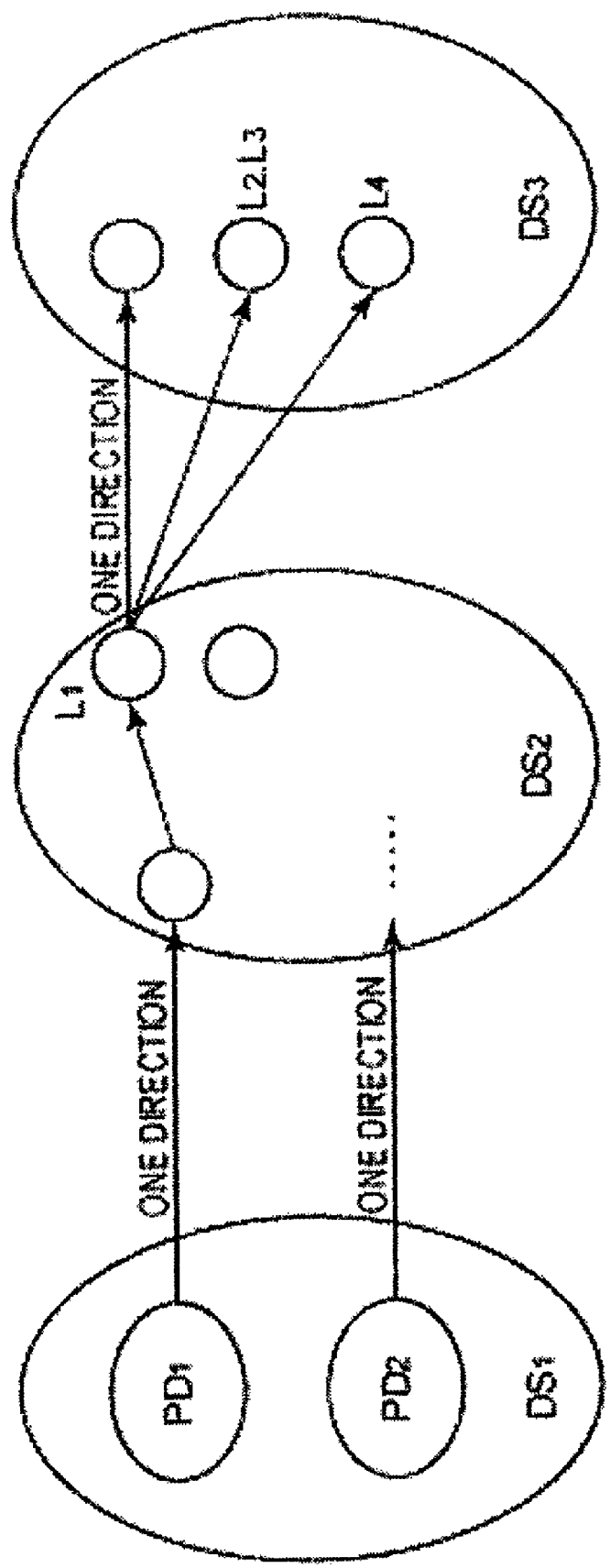
FIG. 1 is a diagram illustrating a relation between data sources of products and parts.

FIG. 1 illustrates a relation between data sources of products and parts. Here, it is assumed that produced products (PD in the drawing) have data indicating that the products are constituted by what parts in the dispersed data sources (DSs), and that parts constituting the products and their attribute values (L) such as a lot number thereof, or the like can be searched once a product number is given. As for the data between different data sources, however, all of the data can be obtained by defining and tracing the relations therebetween. The relations are fundamentally unidirectional.

Here, when a quality problem causes product failure, the failure is not always revealed on all the products, and instead a part of the faulty products can be identified. For example, product serial numbers of failed products are reported as faulty products. Among these quality problems, it is especially required to identify problems whose cause is a combination of parts belonging to different data sources (for example, different parts suppliers), by tracing part attribute data (for example, lot numbers of parts or the like) existing in the dispersed part databases from the known faulty products. Additionally, it is also an issue to predict a failure, which has not been revealed yet, by specifying a cause of failure, to thereby search for a recall target of the products, for example.

Hence, it is one object of the present invention to specify, in a system for managing the product quality by dispersed parts tree data, whether or not a combination of parts belonging to dispersed data sources (for example, various parts suppliers) is a cause of failure by tracing part attribute data (for example, lot numbers of parts or the like) existing on a parts tree from known faulty products. Particularly, it is an object to find out a highly possible cause of failure without performing a search of data of all parts of all products, whose access cost is high.

In one aspect of the present invention, there is provided a method for obtaining a combination of part attribute values as a candidate of a cause of failure from data of bill of materials holding attribute values of parts, the method including the steps of: extracting part attribute values each having a support higher than a predetermined value from a set of faulty products; calculating an information gain of a rule that a combination of the part attribute values each having the support higher than the predetermined value is a cause of failure; and selecting the rule having the information gain larger than a predetermined threshold.

Additionally, in the step of extracting the part attribute values each having the support higher than the predetermined value, a subset of the parts used in the faulty products is simultaneously obtained. Further, in the step of calculating the information gain, when pieces of parts information are distributed at different locations, a set of common parent parts of two parts is obtained by tracing from two parts having respective attribute values, and an information gain of a rule that having two part attribute values is a cause of failure is calculated from the subset of common parent parts used in the faulty products, by using only parts sub-tree information of the bill of materials, in addition to the above-mentioned method.

This method can also be expressed as follows. The dispersed parts tree are sequentially traversed from a set of known faulty products (a set of products reported to be failed currently) to access the parts data, and items each having a higher support (part attribute values frequently appearing in the faulty products in common) in the faulty products are extracted. In this step, a subset of the parts used in the faulty products is simultaneously obtained for the respective parts having a higher support. The part attribute values having a higher support and the subset of parts used in the faulty products are represented as a tree in which a parts type serves as a node. Incidentally, as for the part attribute values, not only a single value, but also a discrete sequence values and a ranged value are treated as one value.

Further, for two part attribute values having higher supports on the parts tree of the parts type, an information gain (Information Gain) of a rule that having attribute values of the two parts is a cause of failure is calculated. This calculation is not performed by tracing all of the parts data of all of the products, but is locally performed to descendants of a common parent part of every pair of the two parts and outputs pairs having a certain information gain as a cause of failure. Additionally, how to select these two part attributes is performed in such a way that part attributes of the parts located closer to each other on the parts tree are first evaluated, and first found part attributes are made a candidate of a cause of failure.

In the present invention, for example, when there is a database on faulty products in which one record corresponds to one faulty product and which has attributes concerning various parts, and when an attribute and a value thereof are given, a ratio of the number of records having that attribute value to the number of all records is called the "support" for a failure of the product by taking that attribute value. Additionally, the "information gain" means a degree that one attribute value of the product is statistically correlated with a product fault. Incidentally, for a general definition of the "support" and the "information gain," technical books for data mining should be referred to.

The above-mentioned method can be implemented by a program causing a computer to execute a function of each step, or an information processing system in which the program is installed.

According to the present invention, it is possible to discover a combination of a plurality of parts dispersed to the data sources as a cause of failure, which is difficult in a general data mining technique or a parts tracing from the viewpoint of performance. At this time, it is possible to calculate a combination having a higher information gain, from only local parts data, which can be accessed with relative ease, without tracing all of the data and parts. As a result, it becomes possible to narrow down target products to the necessary minimum in a recall process when a quality problem should occur, to make a root cause analysis easier, or to predict the quality problem in advance to thereby lead to an improvement in product quality or a reduction in development and maintenance cost.

It is difficult to obtain all of the parts used in products and attributes thereof, since data sources are dispersed. However, since data concerning one certain part is in one data source, it is possible to access a large amount of data records for a single part with relative ease. Moreover, it is also easy to locally traverse a subtree of the parts, instead of the whole tree. It is supposed that this trace can not only obtain descendant parts from products and parts, but also obtain all of ancestor parts (products) of parts having a specific attribute value (a lot number), conversely.

Here, considering $\underline{A}$ as a total set of produced products, it is supposed that a set $\underline{F}$ of products in which a failure is found in a sufficiently small size (for example, 100 units) compared with the number (for example, 1 million units of produced products) of elements of set $\underline{A}$ (represented as $PD_p$, for details, refer to definition of symbols used in algorithm or problem definition described below) are identified, is given. It is possible to trace parts $_pP_{ij}$ from each of the faulty products $PD_p$ according to a parts tree. Here, i represent what layer the part is in the parts tree (0 layer represents the product itself), and j represents what order the part is in the same layer. Additionally, the manner in which the part $_pP_{ij}$ is assembled to the product $PD_p$ or the parent part $_pP_{(i-1)j}$ is represented as $PD_p \rightarrow _pP_{ij}$ and $_pP_{(i-1)j} \rightarrow _pP_{ij}$ respectively. Further, an attribute, such as a lot number, is attached to each part, and this attribute value is represented with $L_t(_pP_{ij})$. A plurality of attribute values may be defined to one part.

An object of the present invention is to look for a rule that the product $PD_p$ has a fault when the attributes of two parts assembled to the product $PD_p$ simultaneously take certain values, respectively. It is required that an information gain of the rule (Information Gain) IG( ) is sufficiently high. The information gain IG( ) is calculated from a decrease degree of entropy that the product fails or does not fail before and after applying the rule. It is well known that the entropy is calculated from formula $-p\log(p)-(1-p)\log(1-p)$ where p is a probability of failing. Whether or not the information gain is sufficiently high can be determined by defining an appropriate threshold of a difference between entropies. The threshold may be determined from system engineering information of the product and statistical information on quality, or may also be experientially determined by executing the present algorithm.

Figure 2:
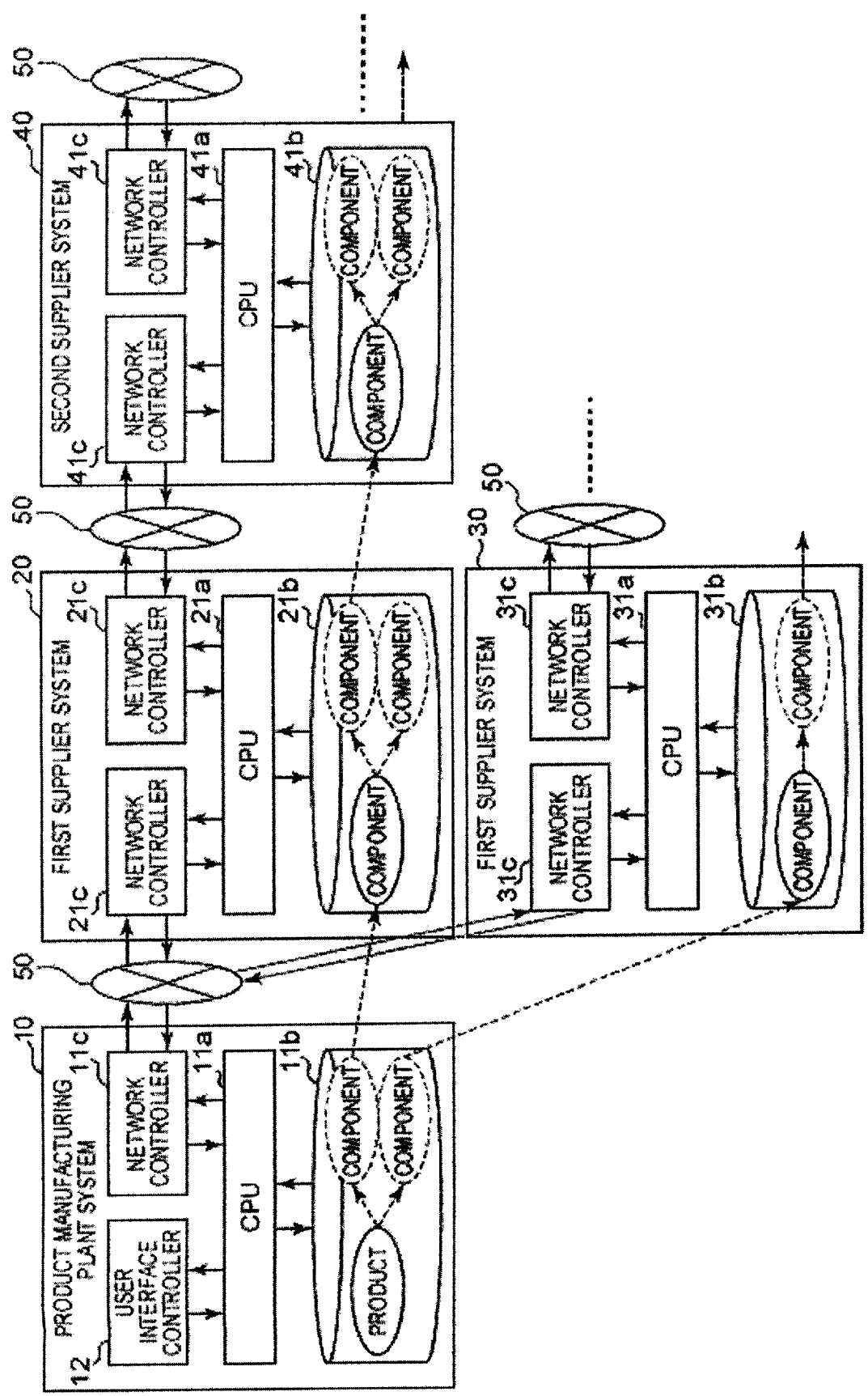
FIG. 2 is a diagram illustrating an example of a configuration of an information processing system which is one embodiment of the present invention.

FIG. 2 illustrates an example of a configuration of an information processing system which is one embodiment of the present invention. In this system, a product manufacturing plant system 10, first-tier supplier systems (20 and 30), and a second-tier supplier system 40 are connected to each other through a network 50. The drawing shows up to the second-tier supplier for simplification, and also many supplier systems over a third-tier supplier, a fourth supplier, or the like can be included. Hereinafter, each of these systems is also called a data source.

Each data source is constituted by, a CPU (11a, 21a, 31a, 41a) as a control unit, a storage unit (11b, 21b, 31b, 41b; also including databases on a memory and a hard disk), a network controller (11c, 21c, 31c, 41c), and the like, and these data sources are connected to each other through the network 50, such as the Internet or the like. The same network or the different networks may be used as the network 50 between the data sources. One same network controller may be used as the network controllers (11c, 21c, 31c, 41c) since they can be constituted in common to the same network, or three or more network controllers may be used if three or more different networks are connected. A portion of parts data (small circle) is stored in each database, and a configuration of the parts is represented with a tree structure. A child-parent relationship of the tree is represented with the dashed-line arrow. The root part of the data source is represented as a virtual node (small circle of the dashed line) in a leaf node of the data source which manages the parent part. Although the leaf node and the virtual node are arranged in the different data sources, they have the same relation logically and are connected with the arrow of the dashed line. Each CPU can access the memory and the database in the same data source freely at a low cost to perform the processing, but when it accesses another data source, communication on the network is required, so that there are problems that the amount of data to be processed is limited and the access takes time comparatively. Incidentally, the arrow of the solid line represents the access to the data and a call of control upon proceeding the process.

The data source 10 in which the product is used as the root also has a user interface controller 12, and first receives a list of the products in which a quality problem has occurred as an input. The CPU 11a executes an algorithm mentioned below, but when it is necessary to process the parts data stored in the memory other than its own memory, it transmits a request, including a required processing, information about a parts ID, or the like through the network 50, to ask the CPU of the data source in which the parts data exists to process it. The processing result is sent from a requested CPU to a requesting CPU upon completing the process, and the requesting CPU continues the process. Upon completing all of the processes, the data source 10 of the product notifies a user of the processing result through the user interface controller 12 and completes the process.

A system level procedure in FIG. 2 will be described. A production history that by what kind of parts all of the produced products are assembled is stored. Logically, the parts assembled to a certain product or part is represented with the tree structure as shown by the dashed line in the drawing and a manufacturing feature that the part has, namely, an attribute value, such as a lot number, manufacturing means, a location, time, an operator(s), or the like is stored in each node representing the part. Physically, not all of the information on the parts is stored in one database, but the information on the parts is stored by the plant and the supplier which manufacture the parts. When another supplier's part is searched (traced), since the supplier's network information (address on the network) and the parts ID are recorded on the corresponding location of its own hard disk, it is read out therefrom, and an information acquisition is requested to the corresponding supplier through the network. The supplier who has received the request reads the corresponding information from its own hard disk based on the parts ID, and returns the result to an original product manufacturing plant (OEM) and a higher level parts supplier by the communication on the network. Also when tracing a logical tree ranging over a plurality of nodes, the information acquisition is performed by repeating such a procedure in a manner similar to that. Further, it is also possible to trace toward the root of the tree (namely, product). It is possible to execute this in a similar procedure to that if the similar network information and parts ID are stored also for a parent's nodes (parts).

Hereinafter, the procedure will be described using elements on this system. This system will be described by separating into three sections, namely, (1) part attribute value extracting section, (2) information gain calculating section, and (3) information gain selecting section, according to the function.

(1) <Part Attribute Value Extracting Section>

It gets a set of faulty product IDs, traces parts used in respective faulty products on the above-mentioned system, and searches for parts having attribute values which appear frequently. Details thereof will be described in the following (a) through (c).

(a) The set of faulty product IDs is passed as an input to the product manufacturing plant system 10. Since the product manufacturing plant system 10 has information that from what parts the product of each ID is assembled in its hard disk, but does not have attribute information of the parts themselves therein, it sends a calculation request to the first-tier supplier systems 20 and 30 of the respective parts through the network communication using the set of parts IDs as a parameter as described in the above-mentioned system.

(b) The first-tier supplier system 20 which has received the calculation request receives the set of parts IDs used in the faulty products, and calculates whether or not there is any attribute value which appears frequently among the attribute values of the parts. It is possible to calculate this by searching the parts database stored in the hard disk with the parts ID and counting each attribute value to thereby obtain a support. The first-tier supplier system 20 returns the parts each having a support higher than a predetermined threshold and attribute values thereof to the product manufacturing plant system 10. The product manufacturing plant system 10 records the received parts and the attribute values thereof as the part attribute which appear frequently.

(c) When the parts of the second-tier supplier system 40 in a lower level are used in producing the supplier's parts, the calculation request is further sent to the second-tier supplier system 40 by using the set of IDs of the lower parts as a parameter in a manner similar to that of (a). The second-tier supplier system 40 calculates a part attribute value which appears frequently in a manner similar to that of (b), and notifies the answer to the product manufacturing plant system 10. This will be repeated until the check for all of the parts is completed.

(2) <Information Gain Calculating Section>

Regarding a combination of arbitrary two parts having the attribute values appearing frequently, which are obtained in above mentioned step (1), an information gain as to whether or not a rule that a failure is caused by the combination is statistically meaningful is calculated. If the higher information gain is selected, the combination of two part attributes considered to be a cause of failure is determined. Details thereof will be described in the following (a) through (d).

(a) A combination of certain two parts is considered. A common part assembling those parts is obtained. Information on an assembly relation between these parts is grasped at the product manufacturing plant, so that it is possible to search them.

(b) The calculation request is sent to the supplier of the common part by the network communication using types of two parts and respective attribute values appearing frequently as a parameter.

(c) The supplier of the common part receives the calculation request of (b), and calculates the set of IDs of the common parts using both of two parts having the two attribute values. A calculation method thereof is performed by obtaining a set which uses the respective parts having the attribute values appearing frequently and calculating the set intersection by either method among the following methods.

(i) If both of the received parts are directly assembled to the common part, searching the attribute values thereof makes it possible to directly calculate a set of common parts IDs corresponding thereto. At this time, if it is necessary to inquire the lower level supplier about the required attribute, it is performed by transmitting a search condition (to have the attribute value appearing frequently) through the network, performing the corresponding search in the lower level supplier, and returning the result.

(ii) If both of the received parts or either of them is not the directly assembling part, it is necessary to perform a reverse trace from the part to the common part. First, a supplier who manufactures the part and holds the attribution information thereof is obtained. This may be inquired to the product manufacturing plant system 10, and may be inquired in turn to the lower level supplier systems. Next, the attribute value appearing frequently is passed to the supplier system, and communication for requesting the start of the process is performed. The supplier system receives the request to calculate the set of parts IDs having the attribute values thereof. Next, the reverse trace to the common part is performed for every element of the set.

(d) The supplier of the common part can calculate the information gain from a set of IDs of the common part using both of the parts appearing frequently, and a set of common parts used in the faulty product which has already been obtained in the above step (1). This can be calculated by a difference between an entropy of failure in all of the common parts, and an entropy of failure in the common part using the parts having the attribute values appearing frequently (this can be obtained by a product of the two sets). A calculation method of the entropy is the same as that given by a typical definition of the amount of information.

(3) <Information Gain Selecting Section>

(e) If the information gain calculated in step (d) of the above step (2) is larger than a predetermined threshold, the parts having the two attribute values may be a cause of failure, so that the result is sent to the product manufacturing plant system 10.

(f) The product manufacturing plant system 10 then repeats the receptions (a) (b) and (e) of the above step (2) for all of the combinations, and then can acquire two parts possibly be a cause of failure and the combination of the attribute values thereof by summarize the received answer.

[Definition of Symbol Used in Algorithm and Problem Definition]

Hereinafter, more details of the algorithm cooperatedly processed by each CPU will be described. Symbols used in the present specification and the drawings will be defined as follows. In the definition, a character with underline shall represent a set.

$PD_s$=product with serial number s $\underline{A}$=set of all of the products $\underline{F}$=set of faulty products. In the present invention, it shall be given.

$_pP_{ij}$=j-the part in i-th layer assembled to product $PD_p$. Specifically, $_pP_{0j}$ is the same as $PD_p$.

$_pP_{ij} \rightarrow _pP_{(i+1)k}$ = $_pP_{(i+1)k}$ is a k-th child of $_pP_{ij}$ in the part tree. Particularly, the part assembled to the product $PD_p$ is written as $PD_p \rightarrow^* \rightarrow _pP_{ij}$.

$L_t(_pP_{ij})$=value of attribute t of part $_pP_{ij}$ $\underline{FIS}_s$=Frequent item set (Frequent Item Set) $\{L_t(\ )=L, L_u(\ )=M, \ldots\}$. Set of attributes ($L_t(\ ), L_u(\ )$, or the like) which appear frequently in the faulty products in a subset $\underline{S}$ of the product, and set of values thereof. Here, L, M, or the like is the attribute value, and includes not only a single value but sequence values and a ranged value. In the following algorithm, $\underline{FIS}$ is represented by the tree and the part attribute, such as $L_t$=L, and the value thereof are added to the node.

$\sup_s(L_t(\ )=\underline{T})=|\{PD_p \in \underline{S}|\exists i \exists j(L_t(_pP_{ij}) \in \underline{T})\}|/|\underline{S}|$. Note that, $\underline{T}$ is in the value range of $L_t(\ )$ and is $\underline{S} \subset \underline{A}$.

$\underline{P}_{ij}$=set of parts $P_{ij}$ $\underline{P}_{ij|C}$=set of parts $P_{ij}$ which satisfies condition C $\underline{P}_{ij|F}$=set of parts $P_{ij}$ assembled to set of faulty product $\underline{F}$. Particularly, $\underline{P}_{0t|F}$=F $H(\underline{F}, \underline{S})$=entropy which fails in product subset $\underline{S}$ $H(\underline{F}, \underline{P}_{rq''|Lt(\ )=L^\cdot Lu(\ )=M^\cdot})=-p\log(p)-(1-p)\log(1-p)$. Note that, $p=|\{P_{rq}|P_{rq} \rightarrow^* \rightarrow P_{ij}$ and $L_t(P_{ij})=L \wedge P_{rq} \rightarrow^* \rightarrow P_{kl} \wedge L_u(P_{kl})=M\} \cap \{P_{rq}|PD_p \in \underline{F} \wedge PD_p \rightarrow^* \rightarrow _pP_{rq}\}|/|\{P_{rq}|P_{rq} \rightarrow^* \rightarrow P_{ij} \wedge L_t(P_{ij})=L \wedge P_{rq} \rightarrow^* \rightarrow P_{kl} \wedge L_u(P_{kl})=M\}|$.

$H(\underline{F}, \underline{P}_{rq})=-q\log(q)-(1-q)\log(1-q)$.

Note that, $q|\{P_{rq}|PD_p \square \underline{F} \wedge PD_p \rightarrow^* \rightarrow _pP_{rq}\}|/|P_{rq}|$ $IG(\underline{F}, \underline{S1} \rightarrow \underline{S2})$=information gain; $H(\underline{F}, \underline{S1})-H(\underline{F}, \underline{S2})$ $IG(\underline{F}, \underline{P}_{rq} \rightarrow \underline{P}_{rq'|Lt(\ )=L, Lu(\ )=M'})=H(\underline{F}, \underline{P}_{rq})-H(\underline{F}, \underline{P}_{rq}"Lt(\ )=L^\cdot Lu(\ )=M")$.

In the present invention, the problem is solved roughly by two steps.

At a first step (it is called a FIS(Frequent Item Set) building step), the dispersed parts data are sequentially accessed according to the parts tree only from a limited set of faulty products (set of products reported to be failed in early stage), and items having higher supports (part attribute values appearing in the failure in common) in the faulty product are first extracted. In this process, the used parts are traced from each faulty product, and the set of parts used in the faulty product is also searched for simultaneously. The part attributes having higher supports and the set of parts used in the faulty product are represented as the parts tree. This parts tree is represented as $\underline{FIS}$.

At the second step, the information gain of a rule that the product is failed when two part attribute values are selected and both of the values are taken is calculated from FIS (rules derivation step; it is called the rules derivation step). At this time, the data of all of the products are not traced but a common parent part of two parts is searched for, and a set of parts used in the faulty product among the parent parts, a set of parts using the part which takes two part attribute values, and a total set of parts are searched for, so that the entropies before and after the rule is applied are calculated from these and the information gain is calculated from the difference therebetween.

Details of the basic algorithm of the first step (FIS building step) are as follows. First, a failure cause parts tree $\underline{FIS}$ to be the result is initialized ($\underline{FIS}$ is considered as a set and is taken as empty set) (1). Next, the part tree of the product is sequentially traced from the root (product itself) (2, 3). The node corresponding to FIS is added first (4). A set of corresponding parts ($\underline{P}_{ij|F}$) traced from the given set of faulty s s products ($\underline{F}$) is searched for to attach the set to $\underline{FIS}$. In practice, since $\underline{P}_{ij|F}$ is sequentially searched for from the root of the tree, it is possible to search for $\underline{P}_{ij|F}$ only by tracing by one level from the parts of the set in the parent node which is higher by one level (5). Here, if there is no part attribute value, such as the lot number, in the part $P_{ij}$, the process will be moved to the following part. If there is the part, it is considered to be a function from the part to the attribute value, and it is represented with $L(\ )$ (6). Here, a higher support (a ratio that the attribute of the failed product is its value) in the failed product ($\underline{F}$) is selected by using a subprocedure getHighSupportAttributeSet( ) which creates and returns a linked attribute value to attach it to the node of $\underline{FIS}$ (7).

Figure 3:
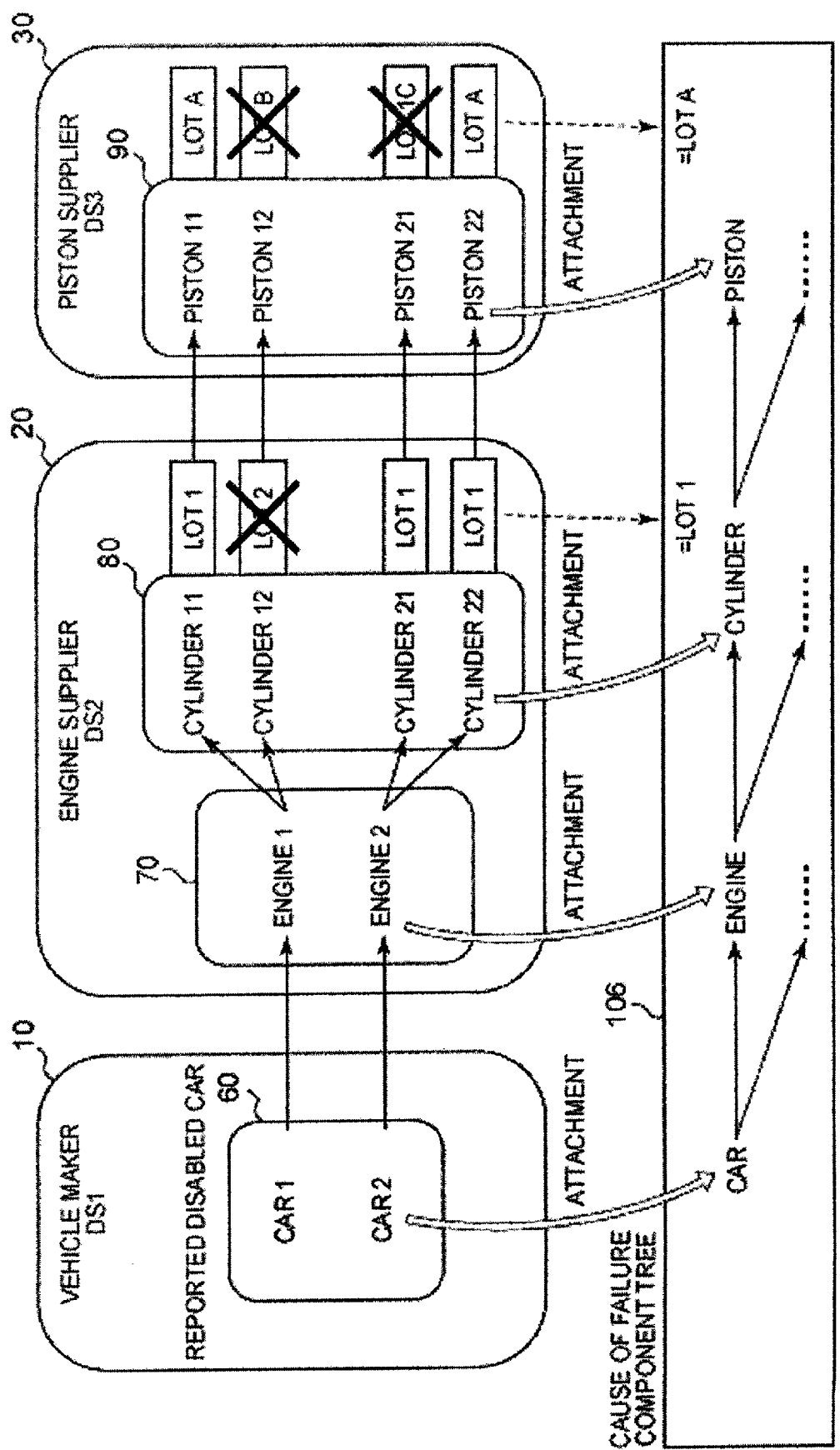
FIG. 3 is a diagram diagrammatically illustrating a first step taking parts (an engine, a cylinder, a piston) of an automobile as an example.

FIG. 3 diagrammatically illustrates the first step taking a part (an engine, a cylinder, a piston) of an automobile as an example. Symbol 60 is a set of reported disabled cars (here, there are only two cars of car 1 and car 2 for simplification), and symbols 70, 80, and 90 are $\underline{P}_{ij|F}$ of respective parts, in which lot 1, lot A, and the like have the part attribute values (they are lot numbers of the cylinder and the piston, respectively) having higher support. The set of faulty parts and the attribute having higher support searched for in the way are attached to a failure cause part tree 106, and the first step is completed if all of the parts have been checked. The built failure cause parts tree 106 is an output of the first step.

Describing more specifically, an engine supplier 20 receives information on an engine 1 and an engine 2 which are used in the disabled car from a vehicle maker 10. While two cylinders are used in each engine, three out of four cylinders are used as the lot 1, so the support of the lot 1 is high as 0.75, and thus it is included in a candidate, but the support of the lot 2 is 0.25, so it is not included in the candidate. Similarly, a piston supplier 30 receives information that the cylinders used in the disabled car are cylinders 11, 12, 21, and 22 from the engine supplier 20 in a higher level, and a support of the piston of the lot A is 0.5 among these cylinders, so it is included in the candidate, whereas supports of the lot B and the lot C are low at 0.25, respectively, so they are not included in the candidate. Since the engine supplier 20 has searched for the cylinder of the lot 1 as a characteristic of the part which appears frequently in the disabled car, it transmits the information to the vehicle maker 10. Similarly, the piston supplier also transmits information that the piston of the lot A is frequently used to the vehicle maker 10.

[Subprocedure getHighSupportAttributeSet( )]

The set of parts ($\underline{P}_{ij|F}$) used in the faulty products, its attribute (L), and the minimum support (min-sup) are given, and a set of values of the parts included in the set and of attribute values having supports not less than the minimum support is returned. Note herein that, if a connected set (a set of serial lot numbers or the like) of attribute values satisfies the conditions, such a connected set will also be included in one of the values.

A result set $\underline{V}$ is initialized (1), and a set of attribute values of the parts which the faulty products have is set to $\underline{T}$ (2). The following process is performed for every subset of F in descendent order (3). First, a not connected subsets of $\underline{T}$ are removed (4). At this time, subsets being meaningless as the attribute value are also further removed using heurisitics rules or the like. While regarding the overall subset as a single attribute value, a support thereof (in a case of a set, all subsets of T including the subset are counted as items) is calculated. A support is a ratio of the number of products including at least one part which takes its attribute value among the sets $\underline{F}$ of faulty products. If the support is not less than the given min-sup, the attribute value thereof is added to $\underline{V}$ (5). After all of the connected sets have been checked, $\underline{V}$ is returned (6).

Figure 4:
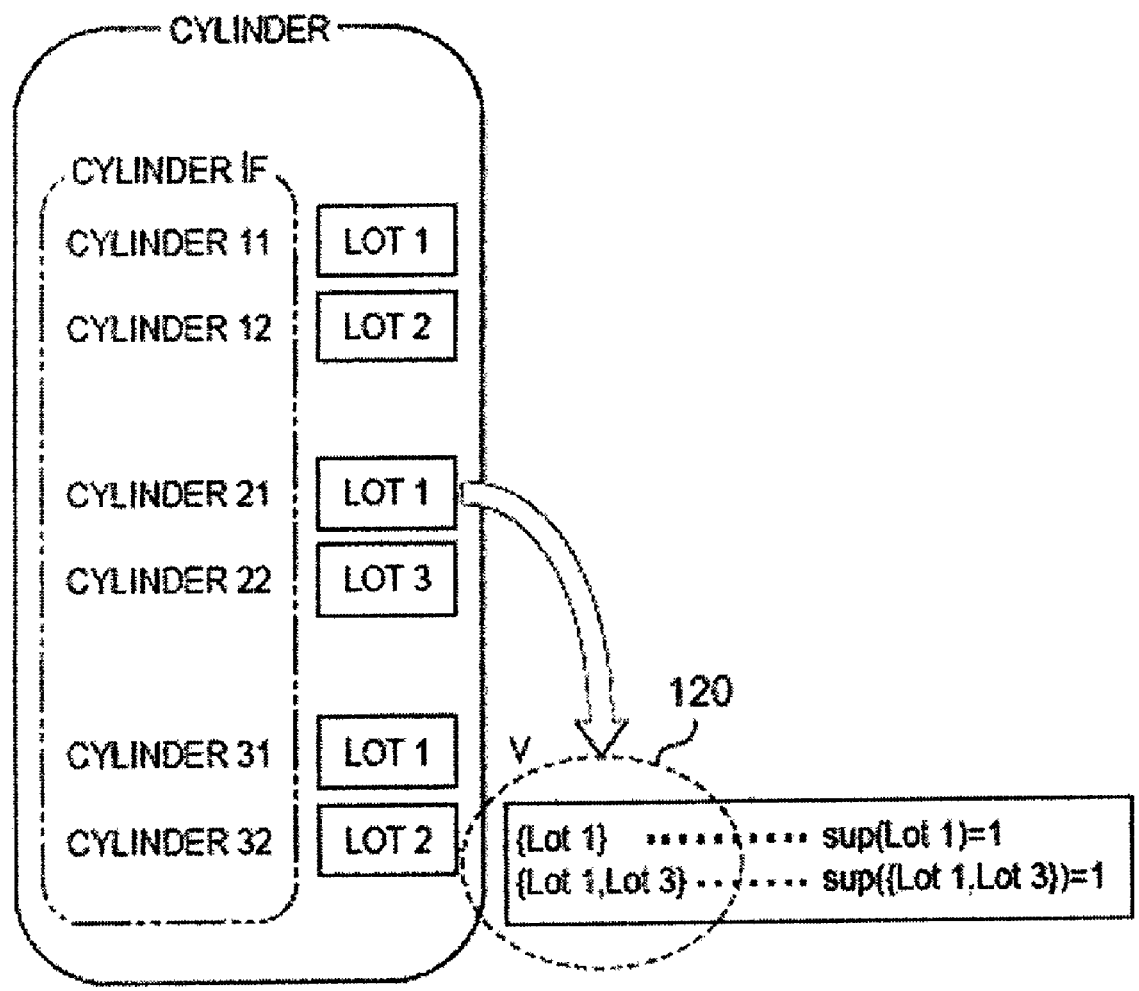
FIG. 4 is a pattern diagram of an operation of getHighSupportAttributeSet( ) using the cylinder parts of the automobile as an example.

FIG. 4 is a pattern diagram of an operation of getHighSupportAttributeSet( ) using the cylinder part of the automobile as an example. Here, sup (Lot1) in the drawing indicates a support of Lot1. In this drawing, while there are Lot1, Lot2, Lot3, and the like as the lot number of the cylinder, it is indicated here that Lot1 and {Lot2, Lot3} satisfy min-sup=1, where Lot2 and Lot3 are continuous values.

Incidentally, the min-sup whish is specified upon calling getHighSupportAttributeSet( ) from a main procedure of the first step can be calculated from a predicted failure rate ($\epsilon<<1$) of the part. Namely, it is assumed that there are parts which do not take that attribute value by the failure rate ($1-\epsilon$).

Details of the rules derivation step (Rule Derivation step) which is the second step will be described hereinafter. First, a common minimum parent node of two parts (a node nearest from two parts among common parent nodes) is searched for. Next, a set of parts having two part attribute values is searched for in respective parts, and a set of parts of the common minimum parent nodes, which uses both of these two parts is searched for by a trace. An entropy that the product fails by simultaneously taking these two attribute values is calculated from a intersection of the set of parts using both of the two parts which are searched for here, and the set of parts used in the faulty products which has been searched for at the first step, on the part of the common minimum parent node. Further, it is possible to search for an entropy before the rule is applied from the total set of parts of the common minimum parent nodes and the set of parts used in the faulty products which has been searched for at the first step. The information gain can be calculated from the difference of these entropies. An information gain which is higher than a certain value is outputted as a candidate of a cause of failure.

(1) Result rule set (O) which becomes a result of the present invention is initialized with the empty set. From following (2) or later, the rule which satisfies the conditions of the result (a combination of lot numbers of a plurality of parts which cause a failure or the like) is added.

(2) It is a start of a loop for checking all of the combinations of the attribute values of the parts which satisfy a given minimum support on the failure cause tree searched for at the FIS building step, from following (3) or later. Lot numbers L and M of parts called a part A and a part B shall be paid attention from (3) or later.

(3) A minimum common part (a common parts located closer to each other on the parts tree) among the common parts assembling two parts A and the part B which are currently seen is searched for. It is possible to search for this by using a database often used in a product management system called E-BOM (bill of materials of design level). This common part is set to C. (4) An information gain that the failure is caused when the lot numbers of the part A and the part B are L and M, respectively, is calculated from the set of parts used in the faulty products, which have already been searched for at the FIS building step or parts using the lot L and the lot M, by the data on the part C.

The calculation of this information gain will be described in more detail. Since the total number of the part C and the number of the part C used in the faulty products (this set has already been searched for at the FIS building step and attached to the failure cause tree) are known, the entropy whether or not the product fails on the parts of the part C is represented with following equation.

Supposing that

P=(the number of the part C used in the faulty products)/(the total number of the part C)

it is possible to calculate the entropy by using $-P \log P-(1-P)\log(1-P)$. This is well known as a calculation method of the entropy of the amount of information.

Next, in order to calculate the information gain, the all parts C which the parts A having the lot number L and the parts B having the lot number M are both assembled to is searched for by a trace, and a similar entropy is calculated within the set of parts.

Namely, supposing that Q=(the number of the parts C, which use both of the lot L of the part A and the lot M of the part B and are also used in the faulty products)/(the number of the parts C using both of the lot L of the part A and the lot M of the part B), it is similarly calculated by using $-1-Q \log(1-Q)-Q \log Q$. The difference between these entropies is the information gain. This indicates how much the combination of the lot numbers of the part A and the part B contributes to the product fault.

(5) If this information gain is larger than a determined value, the lot numbers L and M of the part A and the part B are added to the set of results.

(6) It moves to the next cycle of the loop for the next combination.

(7) The set of results is checked and the threshold of the information gain used in (5) is adjusted. Namely, the threshold will be reduced if there are insufficient results, and, on the contrary, the threshold will be increased if there are too many results, and then it will repeat from (1) or later.

Figure 5:
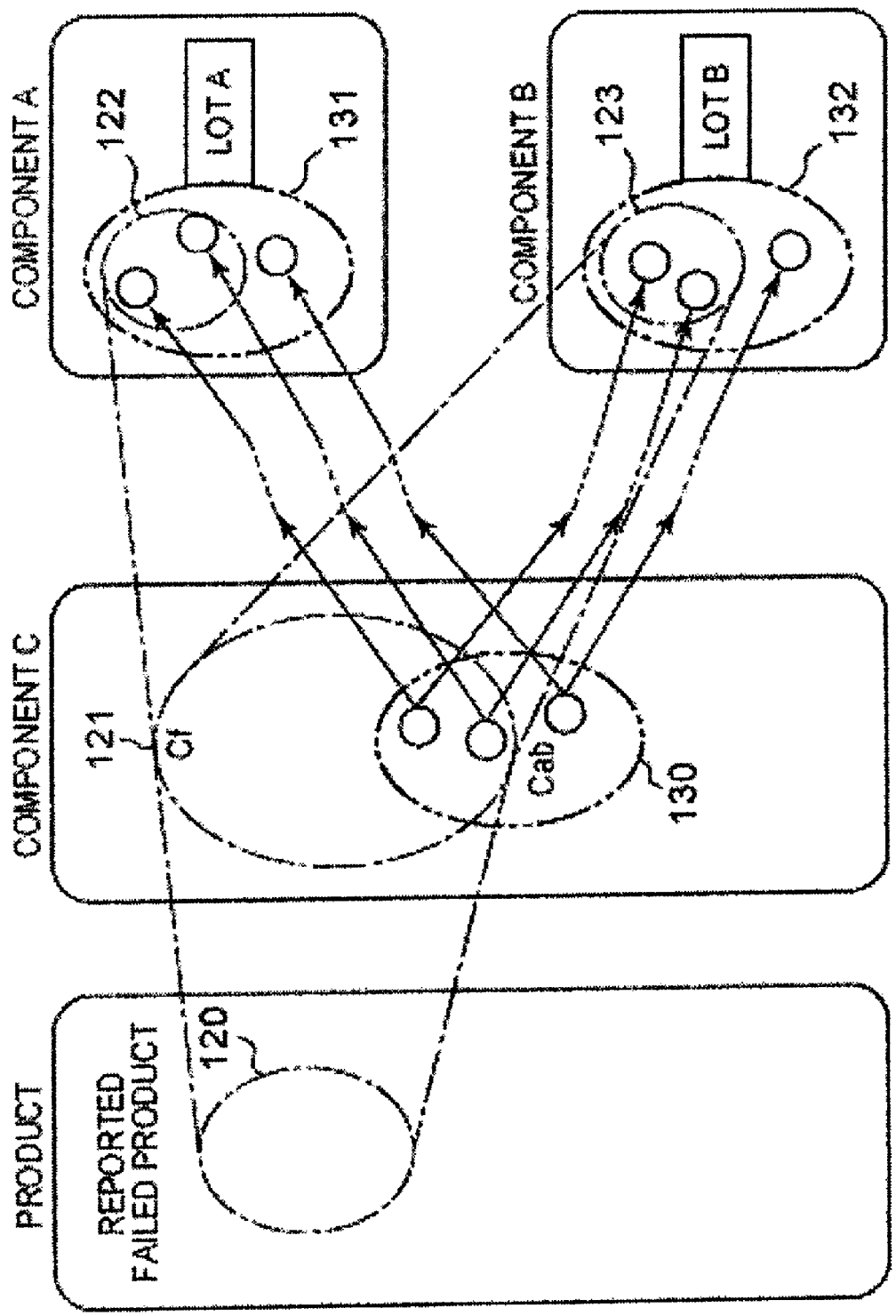
FIG. 5 is a diagram for explaining the calculation method of the information gain using only part of the parts tree with an example.

FIG. 5 is a diagram for explaining the calculation method of the information gain using only part of parts tree with an example. The parts considered from (2) or later is sets 131 and 132 of the lot numbers of the lot A and the lot B of the part A and the part B, respectively. Incidentally, the sets of lot A and lot B used in the faulty products which has been searched for at the FIS building step are represented by lines 122 and 123, for reference. Ratios of the sets 122 and 123 to the sets 131 and 132 indicate the respective supports, and these satisfy a condition of not less than the minimum support.

Here, the part C to which the part A and the part B are assembled in common is found (a set 130 in the center of FIG. 5). While such a common part in a level higher than the part C is possibly found, a minimum part (a part nearest to the part A and the part B on the part tree) among them shall be selected.

Next, parts which are the parts of the part C and uses the parts of the lot A of the part A and the parts of lot B of the part B is searched for by a part tracing function. In FIG. 5, the arrow indicates an assembly relation. This arrow is traced conversely. Generally, such a trace requires a higher cost, but since the part C, and the part A and the part B are located closer to each other on the parts tree, the cost is relatively low even if a remote access is required. The set indicated by the central symbol 131 is the set of searched parts of the part C (leveled as Caf). Note herein that the set of parts (Cf) used in the faulty products of the part C has already been searched for at the FIS building step.

Here, it is possible to calculate the aimed information gain from all of the parts C, the Cf subset 121, and the Cab subset 130. Incidentally, such a calculation can be strictly performed in the set of products (at the left corner in FIG. 5) by tracing the whole part tree, but since the data sources are dispersed as described in the problem of the present invention, a trace on the tree from any part to the assembling product is difficult. Hence, according to the present invention, the trace of the part A, the part B, and the part C is performed within only neighboring data sources whose access cost is relatively low, thereby it is possible to calculate the information gain.

Figure 6:
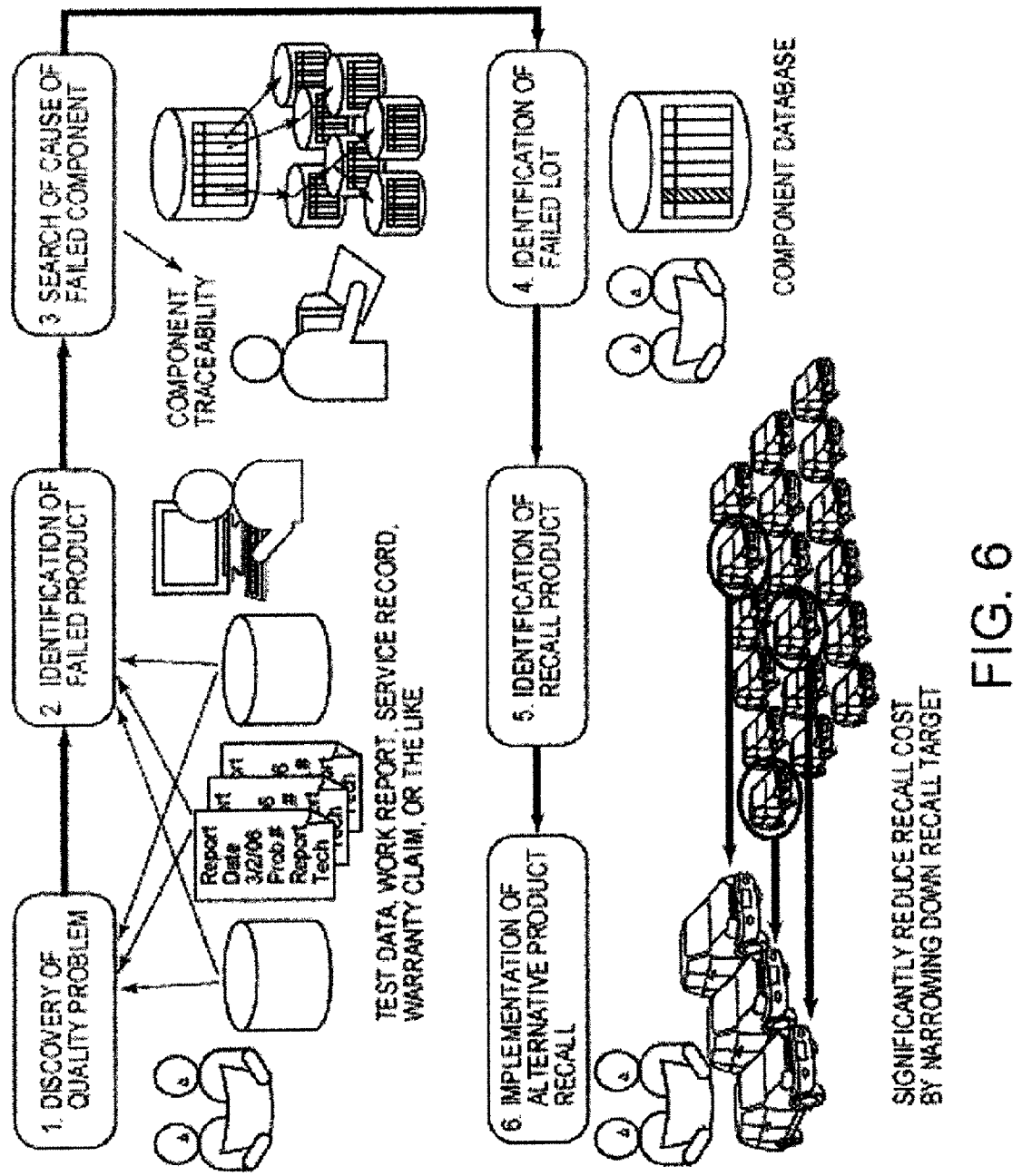
FIG. 6 is a diagram illustrating a implementation example of a failure discovery, an analysis, a cause identification, and a recall target process in an automobile manufacturing company.

In one embodiment FIG. 6 is an implementation example of a failure discovery, an analysis, a cause identification, and a recall target process in an automobile manufacturing company.

In a process 1 of FIG. 6, an example of quality problems (abnormal operation, generation of unusual sound, or the like) are reported from a repair plant, a manufacturing site, or the like. In a process 2, a known set of disabled cars is searched for from the reported cases where the failure possibly occurs due to a specific cause using existing techniques, such as text mining or the like from the reports. It can assume that two or more independent causes of failure are not mixed clearly in a failed product set F of the present invention. A process 3 is a process of searching for a combination of part attributes to be the cause of failure according to the present invention.

Figure 7:
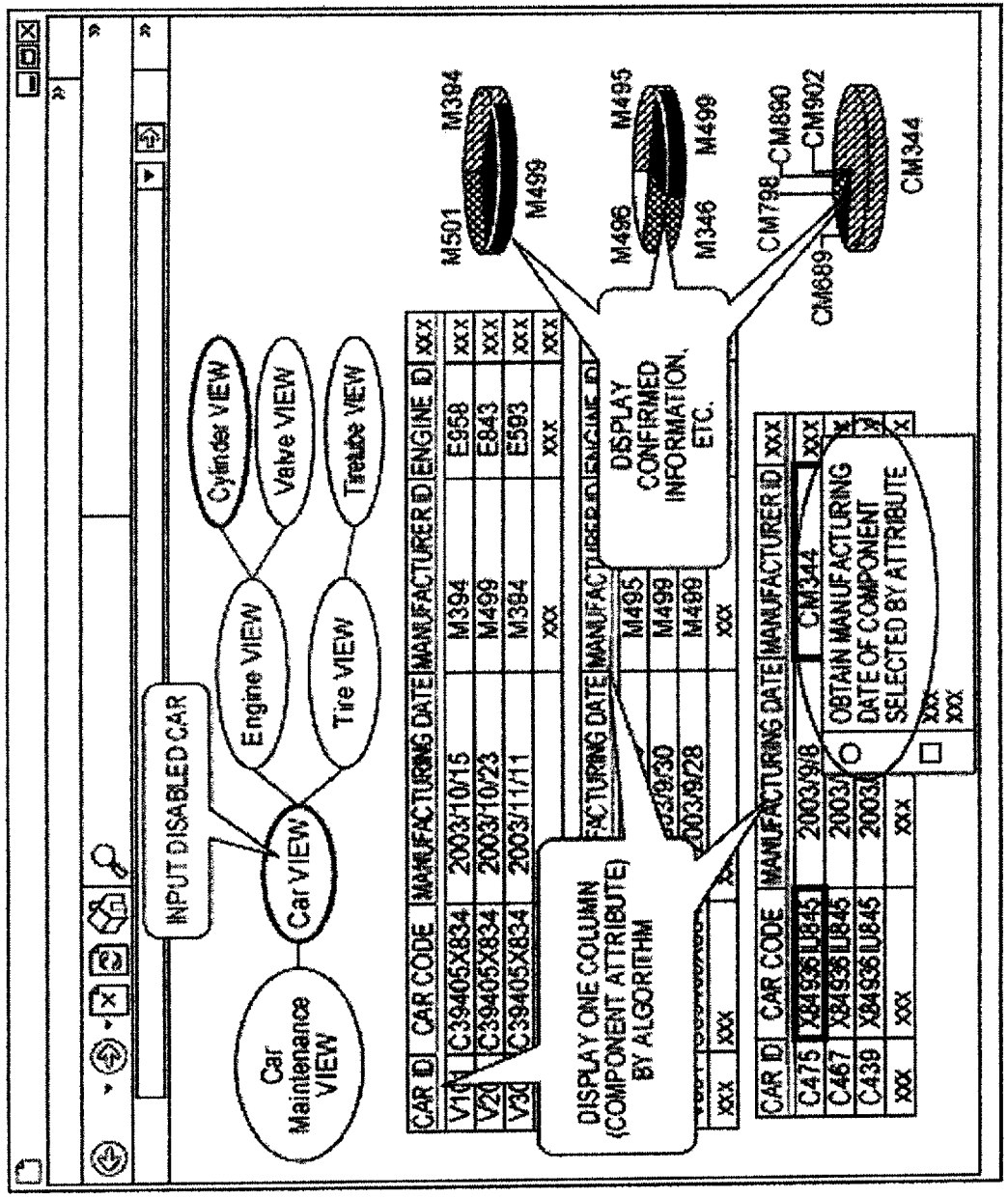
FIG. 7 is a diagram illustrating an example of a GUI screen of the failure discovery, the analysis, the cause identification, and the recall target process using the present invention in the automobile manufacturing company.

More specifically, in the process 3, a quality engineer perform an operation using GUI as shown in FIG. 7. First, a "carVIEW" node on a screen is clicked, and the set of disabled cars (specifically product serial number) searched for in the process 2 is inputted. Since the parts of the automobile are displayed on the parts tree, a node of a suspicious part is clicked based on experience and knowledge of the engineer to display the attribute of the part, or to graphically display the support. If the support of the attribute value of the part used in the faulty product is high, the attribute is clicked and marked. This is repeated to other parts, and thereafter, the second step of the present invention is executed to automatically display the combination of the parts having higher information gain on the screen. At this time, the information gain is graphically displayed, and the most suspicious combination is determined as a cause of failure. If there is no suspicious combination, the same procedure is then repeated for the single part to determine a suspicious single part. At this time, it is possible to identify a more accurate cause of failure using visualized information, such as the information gain or the experience and knowledge of the engineer (process 4).

In a process 5, the result of the process 4 is used, and an automobile that may fail is determined by using quality control data, such as bill of materials. In a process 6, a recall process, such as recall and repair, is executed only for the necessary minimum vehicle.

In a second embodiment, the combination of the parts which becomes a cause of failure can be found according to processes similar to those (1 through 4) of the first embodiment. An engineer of a product development executes a root cause analysis based on such information, thereby it is possible to identify a fundamental problem, for example, inconsistency of engineering parameters (a size, an output, or the like) of two parts) on engineering more readily, and take required actions (a redesign, a change of a production method, or the like) quickly.

Further, such an analysis makes it possible to predict an occurrence of new quality problems in advance and to suppress the cost of the product development by taking an appropriate preliminary action.

(1) A case where faulty products whose number is so sufficient that the size of the faulty product set is statistically meaningful about a cause of failure is effective (it is shown that when there is only one failed product due to one cause, (for example, when only one product is manufactured from a part of a certain lot to be a cause of failure) or when all of the manufactured products may be failed (for example, design problem), the present invention is inapplicable).

(2) Further, a case where these causes (part to be the cause) are not obvious, and a physical analysis is difficult by obtaining actual failed products is effective. For example, the cases where the recall from the used is difficult since cooperation of the user is not obtained the product is so physically huge that the movement is difficult sending an engineer or the analysis in the field is difficult, the failed products itself are lost, or the like.

(3) The production history data for every part are dispersed. Those traces take time and effort.

(4) The cause of failure can be assumed to be the same one through analysis on data in the quality reports, such as a symptom of the failure. Namely, the set of faulty products in which two or more independent causes are mixed is not given. For example, it is possible to analyze symptoms, such as "an unusual sound is heard from an engine". "a wiper does not work", "a door does not open", or the like to thereby narrow down to only a single symptom (it can be not always narrowed down to one at 100%).

(5) The attribute (lot number or the like) of each part intended to be a target here does not have a correlation between the attribute values of the parts which are different from each other. If not, for example, if all of the parts of a product produced in April have a single lot number, respectively, it is not possible to give the answer based on the present invention even if a failure occurs for the product produced in April. It is because the supports of the lot numbers of all of the parts become high as they take a single value, and all of the respective information gains become the same. Since it is unnatural that the lot numbers of all of the parts take the same value equally, this assumption is sufficiently realistic.

(6) The cost of the reverse trace from the ID of the part which has the attribute value appearing frequently in the faulty products to the product is high, and the trace is not so accurate.

(a) Since the bill of materials is usually used also for assembly work, it includes detailed information that which sub-part is assembled to which part. In many cases, since mapping of 1 to 1 is achieved, and an index and a pointer are fully equipped, the trace in forward direction can be performed easily and highly precisely. However, information where a certain part is used is required in the reverse direction, but such information is not directly stored in the database in a form, such as a reverse pointer, so that it is necessary to search the database (it is expensive compared with the index or the pointer). Particularly, that the part of the lower level supplier is used in which part of the higher level supplier is not identified by the lower level supplier, and it is necessary to request the higher level supplier to perform the similar search through the network, so that the communication cost is further added.

(b) Further, the reverse trace is not configured in the form of 1 to 1 mapping in many cases from a viewpoint of manageability of holding data, economical efficiency, or the like. For example, there is a case where it can be traced only by a many-to-many relation when seeing it as a single piece of part, such that the part of this lot is assembled by sub-parts of this lot and that lot. In this case, not only it is expensive, but also an accuracy of the result due to the reverse trace (it is desired to search for a product using this part, but even a product which does not actually use it will be included, or the like) is decreased. There is a demerit in this that, in addition to an increase in calculation amount due to expansion, an accuracy of a calculation result also gets worse.

(1) A discovery example of a cause of failure resulting from a manufacturing problem or a difference in supplier lots: a failure which happens due to the combination of two parts resulting from a manufacturing variation. For example, an unexpected wear occurs due to mismatching between diameter sizes of a piston part and a cylinder part of an engine, resulting in an unusual vibration of the engine. The diameters of the piston and the cylinder are decided by a supplier (when there are a plurality of suppliers), a lot number, a manufacturing operator, a manufacturing machine, or the like. Particularly, since the lot number given a value correlated with other attributes in many cases, it turns out that a problem is caused in a specific combination of the piston and the cylinder by applying the present invention using the lot number as the attribute.

(2) A discovery example of a defect cause due to a design change of both or either parts in the combination of two parts: similarly, mismatching between the piston and the cylinder of the engine. This time, supposing that the design of the piston is changed and a minor number of a part number is increased by one. However, an interference with a cylinder of a specific lot occurs due to the design change, results in a breakage in the worst case. In this case, if the part number is also considered as the attribute, a combination can be found by using the lot number of the cylinder and the part number of the piston as the attributes. Note herein, as for a problem of a new product design itself, since failures should occur in all of the manufactured products, it is not included in the explanation of the present specification.

Hereinafter, a trial calculation is made about improvement in system performance of the present invention. Here, following preconditions are set.

(Precondition of Calculation in Automotive Manufacturing Industry)

100,000 cars per year are produced in a certain type of car (it is about 300 cars per day), the part management of a finished car is for about 1 million cars as ten years on the average.

The number of parts used in one finished car is hundreds of thousands, but the number of major parts which need to be managed in the database is 50,000.

Supposing that the number of parts directly treated by the OEM (product manufacturing plant) among the above-mentioned major parts is hundreds. A part hierarchy is up to three through five layers, and supposing that child parts of about 10 to 100 are assembled to one part. If modeling is made such that a first layer is assembled by the parts of 100, second and third layers are assembled by the parts of 10, and a fourth layer is assembled by the parts of 5 on average in the part hierarchy of four layers, one finished car will be made from the major parts of about 50,000 as represented by following equation.

$$1*100*10*10*5$$

Supposing that each supplier treats about 1 to 10 parts, and there are about 50 first-tier suppliers, and 3 to 4 second-tier suppliers and third-tier suppliers for parent parts, respectively, resulting in 50*3*3, so that there are about 500 suppliers, and respective assembled parts and detailed information thereof shall be owned by each supplier. However, the OEM or the company of the parent part shall grasp a Serial number or a lot number of the parts which they use for the assembly.

the OEM and respective suppliers (500 companies) are connected with each other through the Internet, and exchange not only a regular trade but also quality information on the part or the like by a Web base system called a supplier portal. An information exchange is implemented as a Web application by using a protocol of not only HTTP but Web service. Since the communication of the Internet is T1 (1.5 Mbps) or E1 (2 Mbps), it is assumed a transmission speed thereof is about 256 Kbytes/sec.

As an attribute of one part, there are a manufacturing date, a worker, a description of activity, an assembly part, an operation history, or the like other than a parts number, a lot number, and a serial number, and a record length per part shall be about 500 bytes.

First, when a normal OEM solves the same problem as that of the present invention, it seems to be natural to uses apriori (and an improved algorithm thereof) which is well known for the data mining. In this ease, it is necessary to be able to access all of the part data from a processing computer of the OEM. Even when the most efficient apriori algorithm is used, all of the records are accessed at least once. Since the number of parts is 50,000 and the record length is 500 bytes per part, a database size becomes so large that 1 million cars×50,000 parts×500 bytes=tens of terabytes. Since original data are distributed to 500 suppliers, accessing them in each case makes the communication to be tens of terabytes, so that it becomes impossible, (even when it becomes tens of bytes supposing that only required data are sent among 500 bytes, it takes tens to millions of seconds=several weeks). In practice, supposing that only production information on one day is sent just once per day as a batch it will be 300 cars×50,000 parts× 500 byte=7.5 G bytes and will be completed about 30 minutes, but even in such a case, it is necessary to access all of the databases of tens of terabytes Even when there is a high-speed secondary storage device (for example, transfer rate of 100 Mbytes to 1 Gbyte per second), it will be tens of thousands to hundreds of thousands of seconds=several hours to several days, for the access of tens of terabytes, so that it cannot be admitted from the object of finding a fault at the earliest possible date. Moreover, a cost of maintaining tens of terabytes of databases is also high.

Next, not mining the database which is centrally controlled in one location, but sequentially accessing each distributed database to calculate a confidence, an information gain, or the like is considered. In order to confirm effectiveness of a calculation (hereinafter, referred to as a sub-tree calculation) using a part of information (sub-tree) on the bill of materials, which is one of the solving means of the present invention, a trial calculation of a case where the sub-tree calculation is not used is made first, here.

First, a lot of faulty parts, which appear frequently (having a large support), are calculated. Cars reported having a fault are assumed to be 1000 in number, here, and the product serial number of the part with about 20 bytes per car is sent to each supplier. Additionally, supposing that there are 100 primary parts per car. The communication from the OEM (product manufacturing plant) to the first-tier suppliers is 1000×20×100=2 Mbytes, so it is the communication within 1 second. It is a search of about millions of parts data (as a database size, it is hundreds of Mbytes) at each supplier, but since a support of a specific lot including 1000 cars (several Mbytes) which are search targets is only calculated, the search and the calculation time are considered to be about several seconds. Next, the product serial numbers of the parts used in 1000 cars of the faulty products are similarly sent to the second-tier suppliers, 1000×20×10=0.2 Mbytes (Here, supposing that there are ten secondary parts in one primary part. Additionally, when noting that the processes of 100 first-tier suppliers are performed in parallel, what is necessary is to consider only the time of one first supplier substantiality.), and it will be several seconds even when a similar processing time in the second-tier suppliers is added thereto. The third-tier suppliers and the fourth-tier suppliers may also be similar to that. The communication for reporting the lot of the part having higher support to the OEM has no problem in time. Considering above, the time while all of the lot numbers of the parts having higher support are collected in the OEM is considered to be within about 10 minutes.

Next, the information gain (it may be a confidence) of the combination of the parts having higher support is calculated. The combination of the lot numbers of the two different parts of the fourth suppliers shall be considered. Additionally, the number of parts per one lot is about tens to hundreds of parts, and since there is a tendency that the number of parts per lot is increased in a lower hierarchy in particular, an average of a lot size of the first-tier to fourth-tier parts is set to 10, 10, 100, and 1000 in number, respectively.

Supposing that the sub-tree calculation of the present invention is not taken into consideration here, the reverse trace to the product level of the OEM will be performed. In the case of the product used in the lot of the fourth part, 1000×100×10×10=10 million, so it will be not less than 10 million cars. In practice, since there is a part which is used in neither the corresponding product nor the parent part thereof, it will be a number that is little more limited. Supposing that the parts of about 1/10 to 1/2 thereof are used, it will become 100×50×5×5=125,000, namely, hundreds of thousands of part data. The amount of data will be hundreds of Mbytes even when each part information is tens of bytes, and considering the transfer rate, it will take about 10 to 20 minutes (note that, in the case of reverse trace, since the number of suppliers of each layer is fundamentally one, neither the communication nor the calculation can be performed in parallel).

Further, in the OEM, the data of hundreds thousands of cars will be accessed from the database for 1 million cars, but this is considered to take time since there are many hit counts for the search (Although it is not so many as the total access, it will become tens of % of the total number of records, and the amount of data transfer itself becomes hundreds of Mbytes). Supposing that the calculation in the OEM takes about 30 minutes, the calculation is completed in about 1 hour per combination of the parts having higher support even when the sub-tree calculation of the present invention is not taken into consideration, so that it turns out that the calculation is completed within several hours even when there are a plurality of combinations. Namely, the calculation which takes several days to several weeks can be completed in about several hours, so that it turns out that a significant improvement in efficiency can be achieved by using traceability on the distributed database even when the sub-tree calculation is not taken into consideration.

Lastly, a trial calculation on an improvement in efficiency due to a local calculation of the sub-tree calculation of the present invention will be made. The procedure of searching for the lot of the part having higher support in the beginning is the same (time for about 10 minutes).

Next, a combination of two parts of the fourth-tier suppliers is calculated. The common supplier may be the third-tier supplier. It is because it is appropriate to consider that the combination of two parts correlated with the failure is physically and logically near rather than being completely far on the tree.

If the combined parts and the lot numbers thereof are found, the third-tier supplier does not need to receive the data from the corresponding fourth-tier supplier. Namely, if the information on the combination of the lot numbers of the fourth-tier parts is received from the OEM, the set of parts using the lots can be calculated from only the local database of its own. Since the lot size of the fourth-tier part is assumed to be 1000, the third-tier part data of about 1000 to 2000 will be searched from the 1 million part databases. This and the data of the third-tier parts used in the faulty products, which is traced in the forward direction trace from the faulty product have the amount of data of about 1000 (when two or more are used in one product, they are not less than 2000), so that the calculation of these product sets is also performed without problems. Generally, it may be considered that the database search and the calculation of this level take about several minutes. Here, if the information gain of the calculation result is larger than the predetermined threshold, the combination of the lot numbers of the parts will be returned to the OEM as a candidate of a cause of failure.

Figure 8:
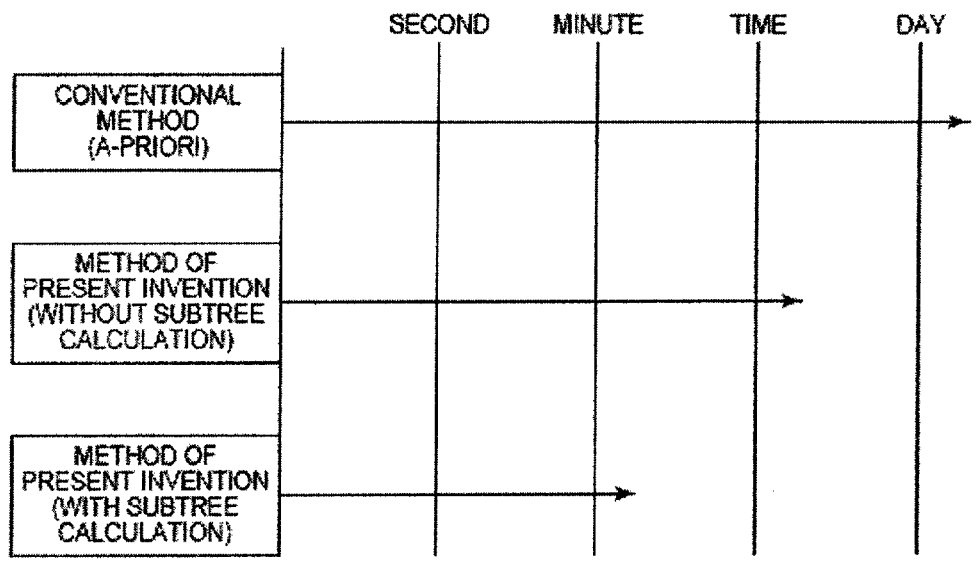
FIG. 8 is a diagram for comparing a system performance of a conventional method with that of the method of the present invention.

When noting that each combination can be calculated in parallel by the different third-tier suppliers, if the sub-tree calculation of the present invention is used, the response can be returned in about 10 to 15 minutes even when how many combinations there are (except a case where two combinations are calculated by the same supplier). The above-mentioned discussion will be summarized as shown in FIG. 8. FIG. 8 is a diagram for comparing a system performance of a conventional method (apriori) with that of the method of the present invention.

Incidentally, referring to an economic effect, since it takes several days for the result to come out according to the typical method using the apriori, 300 cars are produced per day and shipped to a market, when these 300 cars may become the recall target, if a recall cost per car is estimated at 100,000 yen, a cost, such as 30 million yen per day, 100 million yen for 3 days, and 300 million yen for 10 days will be additionally required.

Moreover, the effect of the sub-tree calculation can shorten the calculation time of 4 to 5 hours to about 10 minutes. In this case, it will not become a large amount of money in converting into the recall cost, whereas in a case of a fault having high danger involving human lives, if an accident should occur, it leads to not only a compensation for damage but also an immeasurable damage against a credibility and an image of the company or the like, so that it is impossible to convert it into the amount of money. Moreover, insurance does not cover the damage against the company reliability, either. In this case, it is clear that a solution as quick as 1 hour or 1 minute is desirable.

Moreover, when considering that the present invention is not used only when a special case where the product causes an accident, but is used an application of calculating metrics, such as a supplier's quality evaluation or the like on a daily basis (tracing from a low quality product which is not failed to identify the supplier), it is very meaningful that the calculation time is shortened from several hours to about 10 minutes in terms of an improvement in efficiency of IT.

In order to calculate the information gain that the combination of certain parts fails, to calculate it by reverse-tracing to the product level and to locally calculate it on the level of the intermediate common parent part are not the same. Here, it is discussed that there is not any problem in this calculation method practically.

Figure 9:
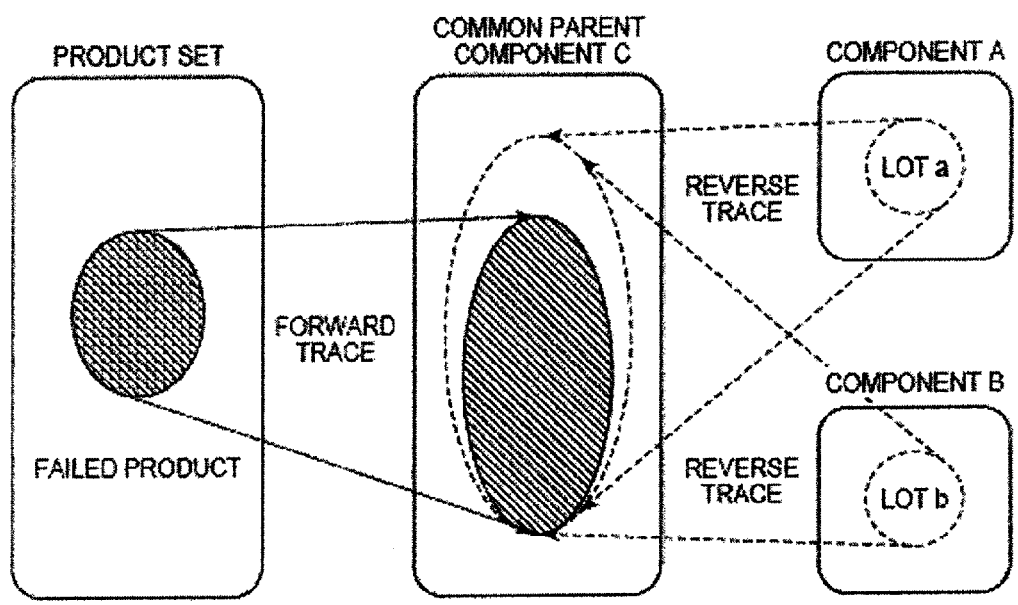
FIG. 9 is a diagram illustrating a case where the common parts C are mostly used in a faulty product and are all assembled from the parts A and B having the same attributes.

First, while a result that there is a meaningful correlation when calculating the information gain in the product level comes out, such result may not be obtained when locally calculating it. For example, as shown in FIG. 9, a case where certain parts C are mostly used in the faulty product and are all assembled from the part A and B having the same attribute is considered.

In this case, since most of the common parent parts are used in the failed product, naturally the combination of the part A and the part B which are the assembly parts thereof also occupy most of the common parent parts C. For that reason, since the original entropy in the common parent part C is extremely low (most of them fail), the information gain is hardly obtained. However, as can be seen from FIG. 9, the combination of the lot a of the part A and the lot b of the part B clearly contributes to failing.

Note herein, it is clear that the common parent part C becomes a cause of failure by itself in this case, and it is immediately calculated that C has a large correlation with the failure. However, whether or not the part C, the part A, the part B, or the combination thereof is the cause cannot actually be determined from the method, such as the data mining. Generally, it is necessary to use an investigation by the engineer, an analysis including other products, or the like.

Figure 10:
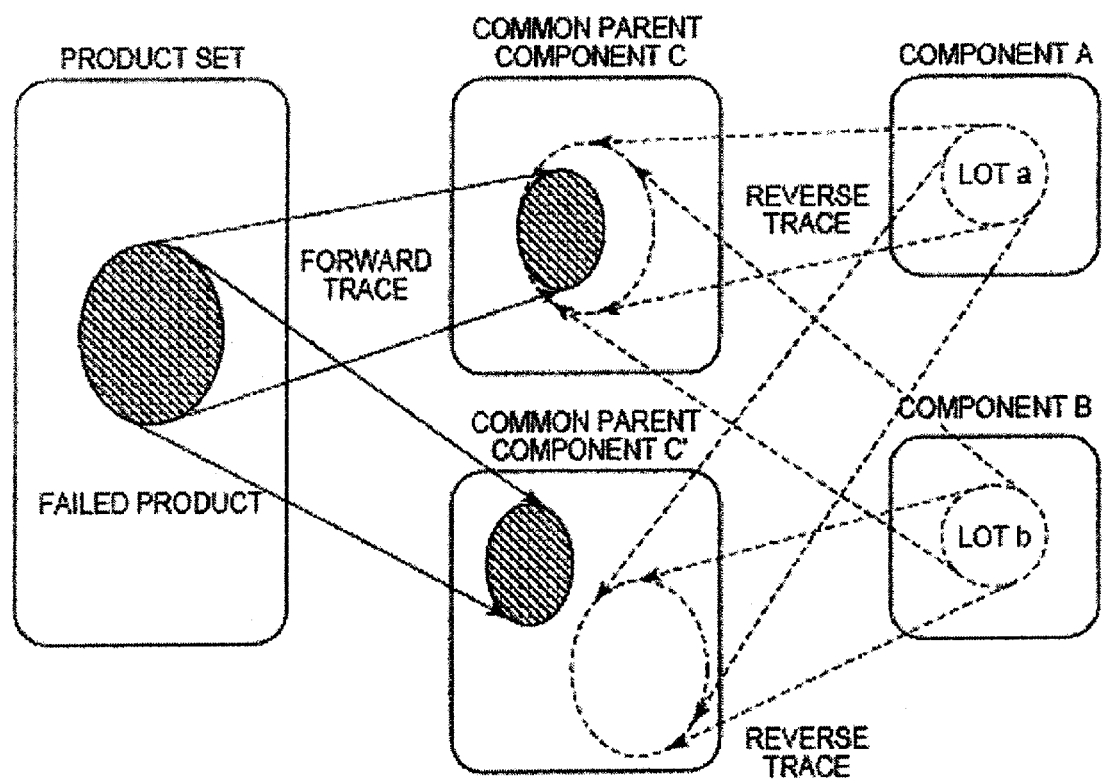
FIG. 10 is a diagram illustrating a case where an information gain which is locally high is provided, but there are many different common parent parts in reality, so that a correlation is not provided in somewhere else.

Next, contrary to the above-mentioned case, there is a case where the information gain which is locally high is provided, but there are many different common parent parts in reality, so that the correlation is not provided in somewhere else as shown in FIG. 10. In this case, when it is calculated by reverse-tracing to the product level, the information gain will not become so high.

In FIG. 10, when only the common parent part C is seen, it is shown that the correlation for the combination of the lot a of the part A and the lot b of the part B to fail is high within C. However, the same lot of the same part is used also in another common parent part C', and when the information gain is calculated within C', the entropy may conversely increase.

In such a case, there is a possibility of resulting in an improper conclusion unless all of the common parent parts are checked. As one solution, it is possible to solve it in such a way that the information gain is calculated on all of the common parent parts, and the information gain increases in all of them, (in a rule that there is a contribution only when the information gain in all of the parent parts is high, when at least one information gain does not increase, there will be no contribution), or a majority thereof is taken.

Figure 11:
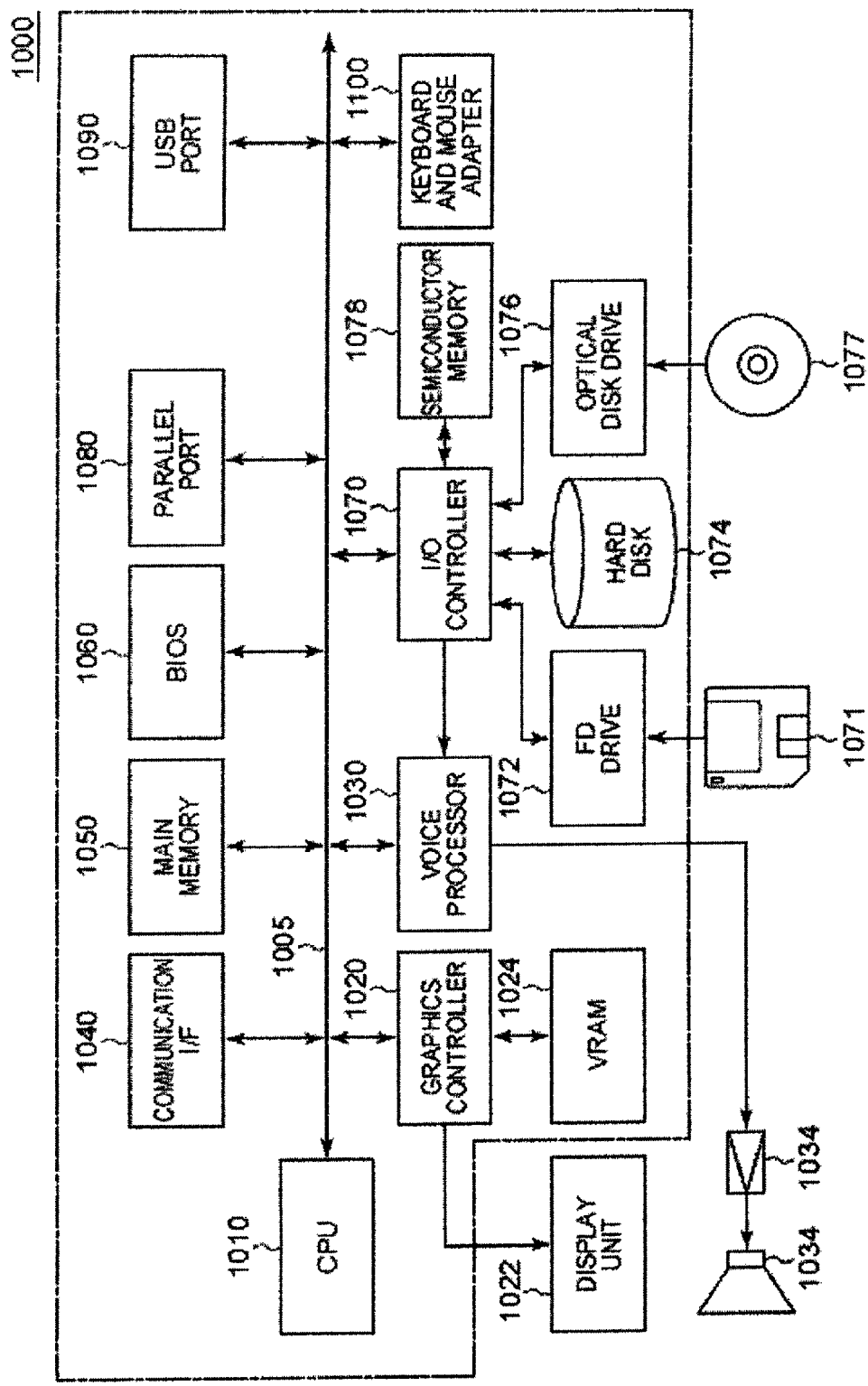
FIG. 11 is a diagram illustrating a hardware configuration of an information processing apparatus 1000.

FIG. 11 illustrates a hardware configuration in which each data source of the information processing system shown in FIG. 2 is represented as an information processing apparatus 1000. Hereinafter, an overall configuration will be described as the information processing apparatus typically indicating a computer, but it is needless to say that a necessary minimum configuration can be selected according to the environment.

The information processing apparatus 1000 is provided with a CPU (Central Processing Unit) 1010, a bus line 1005, a communication I/F 1040, a main memory 1050, a BIOS (Basic Input Output System) 1060, a parallel port 1080, a USB port 1090, a graphics controller 1020, a VRAM 1024, a voice processor 1030, an I/O controller 1070, and input means, such as a keyboard and mouse adapter 1100. Memory means, such as a flexible disk (FD) drive 1072, a hard disk 1074, an optical disk drive 1076, a semiconductor memory 1078, or the like can be connected to the I/O controller 1070.

An amplifier circuit 1032 and a loudspeaker 1034 are connected to the voice processor 1030. Additionally, a display unit 1022 is connected to the graphics controller 1020.

The BIOS 1060 stores a boot program product that the CPU 1010 executes upon booting the information processing apparatus 1000, a program product depending on the hardware of the information processing apparatus 1000, or the like. The FD (flexible disk) drive 1072 reads the program product or the data from a flexible disk 1071, and provides it for the main memory 1050 or the hard disk 1074 through the I/O controller 1070.

As the optical disk drive 1076, a DVD-ROM drive, a CD-ROM drive, a DVD-RAM drive, and a CD-RAM drive can be used, for example. In this case, it is necessary to use an optical disk 1077 corresponding to each drive. The optical disk drive 1076 reads the program product or the data from the optical disk 1077, can also provide it for the main memory 1050 or the hard disk 1074 through the I/O controller 1070.

The computer program product provided to the information processing apparatus 1000 is stored in a record media, such as the flexible disk 1071, the optical disk 1077, or memory card, and is provided by the user. This computer program product is read from the recording medium through the I/O controller 1070, or is downloaded through the communication I/F 1040, thereby it is installed in the information processing apparatus 1000 to be executed. Since the operation that the computer program product causes the information processing apparatus to perform is the same as that in the apparatus which has already been described, it will be omitted.

The above-mentioned computer program product may be stored in an external storage medium. As the storage medium, an optical magnetic recording medium such as MD, and a tape medium other than the flexible disk 1071, the optical disk 1077, or the memory card can be used. Additionally, a storage unit, such as a hard disk or an optical disk library provided in a server system connected to a private telecommunication line or the Internet may be used as the recording medium to provide the computer program product to the information processing apparatus 1000 through a communication line.

The above example mainly described on the information processing apparatus 1000, but the program product having the function described on the information processing apparatus is installed in the computer to operate the computer as the information processing apparatus, thereby making it possible to achieve a similar function to that of the information processing apparatus described above. For that reason, the information processing apparatus described as one embodiment in the present invention can also be achieved by the method and the computer program product thereof.

The apparatus of the present invention can be achieved as a hardware, a software, or a combination of the hardware and the software. In an implementation by the combination of the hardware and the software, a typical example includes an implementation by the computer system having a predetermined program product. In this case, the predetermined program product is loaded in and executed by the computer system, thereby the program product causes the computer system to perform the processing according to the present invention. This program product is constituted by a group of instructions which can be expressed by an arbitrary language, a code, or a notation. Such an instruction group enables the system to perform a specific function directly or after either or both of (1) conversion to another type of language, code, or notation, and (2) duplication to another medium are performed. Of course, the present invention encompasses not only such a program product itself but also a program product including a medium with the program product recorded thereon. The program product for performing the function of the present invention can be stored in an arbitrary computer readable medium, such as a flexible disk, an MO, a CD-ROM, a DVD, a hard disk drive, a ROM, an MRAM, a RAM, or the like. In order to store in the computer readable medium, the program product can be downloaded from a different computer system connected via a communication line or can be reproduced from another medium. The program can also be compressed or divided into plurality to be stored in a single or multiple recording medium.

As mentioned above, although the present invention has been described based on the embodiments, the present invention is not limited to the embodiments described above. Furthermore, the advantages of the embodiments of the present invention are described only by way of citing the most suitable advantages derived from the present invention, and thus the advantages of the present invention are not limited to those described in the embodiments or the examples of the present invention.

What is claimed is:

1. A method of identifying candidate parts of a product failure over a computer network wherein the candidate parts are used to issue a recall, comprising using a computer to perform the steps of:

searching a bill of materials retrieved over the computer network by scanning the bill of materials for parts with part attribute data of a failed product;

acquiring part attribute values from the part attribute data of the failed product;

storing parts records of parts having attribute values whose generated degree of support is higher than a predetermined value and further storing the attribute values of the parts stored in the parts records as frequently-appearing part attribute values;

assembling together a record of common parts having the stored frequently-appearing part attribute values and storing the record of common parts having the stored frequently-appearing part attribute values in a database;

assembling together a record of all common parts associated with the failed product and storing the record of all common parts associated with the failed product in the database;

calculating a failure entropy among the record of all common parts associated with the failed product;

calculating a failure entropy among the record of common parts having the frequently-appearing part attribute;

calculating an information gain based on a difference between the failure entropy calculated among the record of all common parts associated with the failed product and the failure entropy calculated among the record of parts having the stored frequently-appearing part attribute; and identifying parts having the frequently-appearing part attribute wherein the calculated information gain is greater than a predetermined threshold value, wherein the identified parts are automobile parts used to issue the recall.

2. The method according to claim 1, wherein
for the part attribute values, a plurality of attribute values of parts are combined and regarded as one value.

3. The method according to claim 1, wherein
in the step of assembling together a record of all common parts associated with the failed product,
a common part is obtained from the bill of materials, where the bill of materials references a tree structure of data including nodes where products and parts comprising the failed product are hierarchically linked, dispersed and stored based upon a network address per node.

4. The method according to claim 3, wherein
in the step of assembling together a record of all common parts associated with the failed product,
one common part is situated at a child node in the tree structure and a parent part is situated at a common parent node with another common part, wherein the another common part is situated at another child node and wherein data of the parent part and the common parts is obtained based upon the network address.

5. The method according to claim 1, wherein
in the step of identifying parts having the frequently-appearing part attribute, the threshold value is increased incrementally.

* * * * *